(12) United States Patent
Foley et al.

(10) Patent No.: US 9,781,057 B1
(45) Date of Patent: Oct. 3, 2017

(54) DEADLOCK AVOIDANCE TECHNIQUES

(71) Applicant: EMC Corporation, Hopkinton, MA (US)

(72) Inventors: Robert P. Foley, Clinton, MA (US); Peter Puhov, Shrewsbury, MA (US); Ronald D. Proulx, Boxborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 870 days.

(21) Appl. No.: 13/923,427

(22) Filed: Jun. 21, 2013

(51) Int. Cl.
  *H04L 12/927* (2013.01)

(52) U.S. Cl.
  CPC .................................. *H04L 47/805* (2013.01)

(58) Field of Classification Search
  None
  See application file for complete search history.

(56) References Cited

U.S. PATENT DOCUMENTS

| | | | |
|---|---|---|---|
| 6,546,443 B1 * | 4/2003 | Kakivaya et al. | 710/200 |
| 6,880,028 B2 * | 4/2005 | Kurth | 710/240 |
| 8,250,257 B1 * | 8/2012 | Harel et al. | 710/38 |
| 8,375,385 B1 | 2/2013 | Harel et al. | |
| 2003/0182348 A1 * | 9/2003 | Leong et al. | 709/100 |
| 2003/0182349 A1 * | 9/2003 | Leong et al. | 709/100 |
| 2009/0193121 A1 * | 7/2009 | Shin | 709/225 |
| 2009/0204764 A1 * | 8/2009 | Larson | G06F 9/5016 711/125 |
| 2012/0303922 A1 * | 11/2012 | Bakke et al. | 711/170 |
| 2013/0067172 A1 * | 3/2013 | Rizzo et al. | 711/148 |
| 2014/0317070 A1 * | 10/2014 | Kesavan | G06F 17/30371 707/703 |

OTHER PUBLICATIONS

Wikipedia, "Deadlock," https://en.wikipedia.org/wiki/Deadlock, Jun. 11, 2013, 4 Pages.
U.S. Appl. No. 13/737,295, filed Jan. 9, 2013, Harel et al.
Deadlock—Wikipedia, "Deadlock," www.wikipedia.org/wikiDeadlock, Jun. 11, 2013, 4 pps.

* cited by examiner

Primary Examiner — Larry Donaghue
(74) Attorney, Agent, or Firm — Muirhead and Saturnelli, LLC

(57) ABSTRACT

Described are techniques for avoiding deadlock. Each consumer is assigned a priority level denoting a number of resource allocation requests that have been currently granted to the consumer. The priority level is incremented for each resource allocation request granted to the consumer. A set of common resource pool(s) and a reserved resource pool are provided. A wait list of pending resource requests made by the consumers is maintained. If no allocated resources of the set of common pool(s) have been released for at least a threshold amount of time and there is at least one request on the wait list, first processing is performed which includes selecting, in accordance with one or more criteria, a first pending resource request from the wait list that was made by a first consumer, and assigning the first consumer exclusive use of the reserved pool for a lifetime of the first consumer.

19 Claims, 10 Drawing Sheets

DEADLOCK AVOIDANCE TECHNIQUES

BACKGROUND

Technical Field

This application generally relates to techniques for use in connection with deadlock avoidance.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. Such storage systems are provided, for example, by EMC Corporation of Hopkinton, Mass. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units, logical devices, or logical volumes (LVs). The logical disk units may or may not correspond to the actual disk drives. Allowing multiple host systems to access the storage system allows the host systems to share data stored therein.

In connection with a data storage system, or more generally any system, resources may be commonly shared and used among multiple entities such as, for example, processes, objects, tasks, threads, and the like. A deadlock may occur with two or more such entities. For example, consider the following simplified illustration with two entities. A first entity enters a waiting state because a first requested resource needed for the first entity to continue is currently being held by a second entity. Additionally, the second entity is also currently in a waiting state because a second requested resource needed for the second entity to continue is currently being held by the first entity. In such a situation, each of the first and second entities are waiting for the other to release a resource. In such a system where both the foregoing first and second entities may be unable to continue thereby remaining in a waiting state for a requested resource indefinitely, the system may be characterized as being in deadlock. In a system where deadlock can occur, it may be desirable to utilize techniques to avoid, detect, and/or prevent deadlock from occurring.

SUMMARY OF THE INVENTION

In accordance with one aspect of the invention is a method of avoiding deadlock comprising: assigning a plurality of consumers a plurality of priority levels, wherein each of the plurality of consumers is assigned one of the plurality of priority levels denoting a number of resource allocation requests that have been currently granted to said each consumer, wherein the one priority level is incremented each time a resource allocation request for the consumer is granted; providing a set of one or more common resource pools and a reserved resource pool, wherein the set of one or more common resource pools are used in granting resource requests made by any of the plurality of consumers and wherein the reserved resource pool is used in granting resource requests made by a single one of the plurality of consumers for a lifetime of the single consumer; maintaining a wait list of pending resource requests made by one or more of the plurality of consumers; determining that no allocated resources of the set of one or more common pools have been released for at least a threshold amount of time and that there is at least one request on the wait list; in response to determining that no allocated resources of the set of one or more common pools have been released for at least a threshold amount of time and that there is at least one request on the wait list, performing first processing including: selecting, in accordance with one or more criteria, a first of the pending resource requests from the wait list, wherein the first pending resource request was made by a first of the plurality of consumers; and assigning the first consumer exclusive use of the reserved pool for a lifetime of the first consumer. The method may include granting the first pending resource request using the reserved pool. The method may include receiving a second resource request from the first consumer; determining whether there are sufficient resources in the set of one or more common pools to grant the second resource request; and responsive to determining that there are insufficient resources in the set of one or more common pools to grant the second resource request, granting the second resource request of the first consumer using the reserved pool. The method may also include responsive to determining that there are sufficient resources in the set of one or more common pools to grant the second resource request, granting the second resource request of the set of one or more common pools. The method may include receiving a third resource request from a second of the plurality of consumers different from the first consumer; determining whether there are sufficient resources in the set of one or more common pools to grant the third resource request; and responsive to determining that there are sufficient resources in the set of one or more common pools to grant the third resource request, granting the third resource request of the second consumer using the set of one or more common pools. The method may include adding the third request to the wait list responsive to determining that there are insufficient resources in the set of one or more common pools to grant the third resource request. The reserved pool may have an amount of resources determined as an upper bound representing a maximum cumulative resource amount potentially required by a consumer a during a lifetime of a consumer. The one or more criteria may include determining which pending resource request in the wait list has a highest one of the priority levels of all pending resource requests in the wait list. If there are multiple pending resource requests in the wait list having a same highest priority level, one of the multiple pending resource requests may be selected having a largest amount of currently allocated memory with respect to the multiple pending resource requests. When the first consumer completes processing, resources assigned to, or used by, the first consumer may be released whereby any resources allocated to the first consumer from the set of one or more common pools are released and whereby the reserved pool is available for reassignment to another one of the plurality of consumers for exclusive use by the another one consumer. Each of the plurality of consumers may be an I/O operation having processing performed to service the I/O operation. The set of one or more common pools and the reserved pool may be pools of memory. Runtime processing for the I/O operation may traverse a path in an object topology corresponding to the runtime processing.

In accordance with another aspect of the invention is a computer readable medium comprising code stored thereon for avoiding deadlock, the computer readable medium comprising code stored thereon for: assigning a plurality of consumers a plurality of priority levels, wherein each of the plurality of consumers is assigned one of the plurality of priority levels denoting a number of resource allocation requests that have been currently granted to said each consumer, wherein the one priority level is incremented each time a resource allocation request for the consumer is granted; providing a set of one or more common resource pools and a reserved resource pool, wherein the set of one or more common resource pools are used in granting resource requests made by any of the plurality of consumers and wherein the reserved resource pool is used in granting resource requests made by a single one of the plurality of consumers for a lifetime of the single consumer; maintaining a wait list of pending resource requests made by one or more of the plurality of consumers; determining that no allocated resources of the set of one or more common pools have been released for at least a threshold amount of time and that there is at least one request on the wait list; in response to determining that no allocated resources of the set of one or more common pools have been released for at least a threshold amount of time and that there is at least one request on the wait list, performing first processing including: selecting, in accordance with one or more criteria, a first of the pending resource requests from the wait list, wherein the first pending resource request was made by a first of the plurality of consumers; and assigning the first consumer exclusive use of the reserved pool for a lifetime of the first consumer. The computer readable medium may further comprise code for granting the first pending resource request using the reserved pool. The computer readable medium may include code for receiving a second resource request from the first consumer; determining whether there are sufficient resources in the set of one or more common pools to grant the second resource request; and responsive to determining that there are insufficient resources in the set of one or more common pools to grant the second resource request, granting the second resource request of the first consumer using the reserved pool. The computer readable medium may include code for granting the second resource request using the set of one or more common pools responsive to determining that there are sufficient resources in the set of one or more common pools to grant the second resource request. The computer readable medium may include code for receiving a third resource request from a second of the plurality of consumers different from the first consumer; determining whether there are sufficient resources in the set of one or more common pools to grant the third resource request; responsive to determining that there are sufficient resources in the set of one or more common pools to grant the third resource request, granting the third resource request of the second consumer using the set of one or more common pools; responsive to determining that there are insufficient resources in the set of one or more common pools to grant the third resource request, adding the third request to the wait list. The reserved pool may have an amount of resources determined as an upper bound representing a maximum cumulative resource amount potentially required by a consumer a during a lifetime of a consumer. The one or more criteria may include determining which pending resource request in the wait list has a highest one of the priority levels of all pending resource requests in the wait list, and wherein, if there are multiple pending resource requests in the wait list having a same highest priority level, one of the multiple pending resource requests is selected having a largest amount of currently allocated memory with respect to the multiple pending resource requests.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
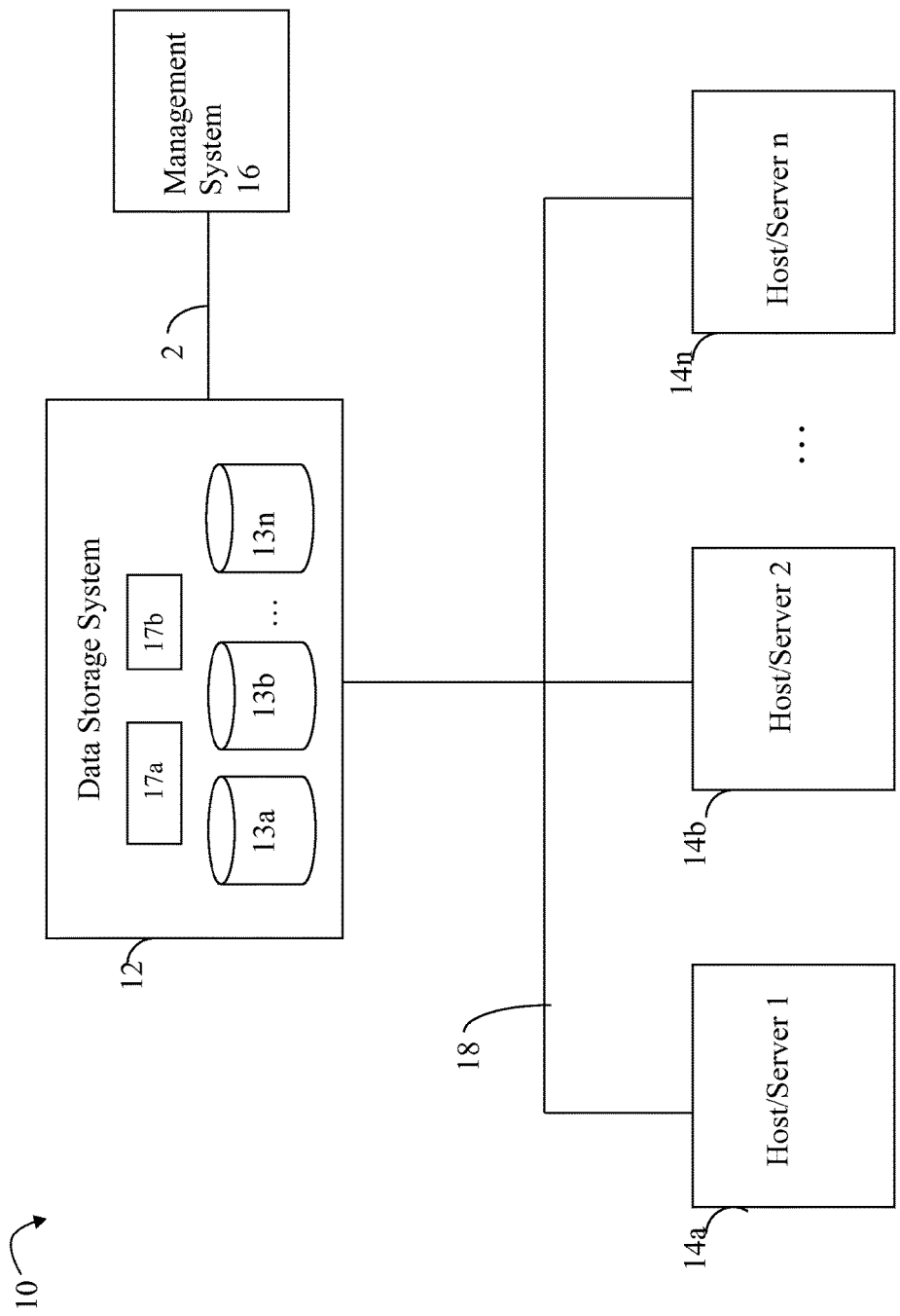
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of a variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

For purposes of illustration, the techniques herein may be described with respect to a single unitary data storage system, such as single data storage array, including two storage processors or computer processing units. Techniques herein may be more generally use in connection with any one or more data storage system each including a different number of storage processors than as illustrated herein. The data storage system 12 may be a data storage array, such as a CLARiiON® data storage array or a VNX® data storage array by EMC Corporation of Hopkinton, Mass., including a plurality of data storage devices 16a-16n and two storage processors 17a, 17b. The storage processors (SPs) 17a, 17b may be computer processing units included in the data storage system for processing requests and commands. In connection with performing techniques herein, an embodiment of the data storage system may include multiple storage processors including more than two storage processors or main CPUs as described. The CLARiiON® data storage system and the VNX® data storage systems mentioned above may each include two storage processors 17a, 17b for performing processing in connection with servicing requests. Additionally, the two storage processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desk top computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
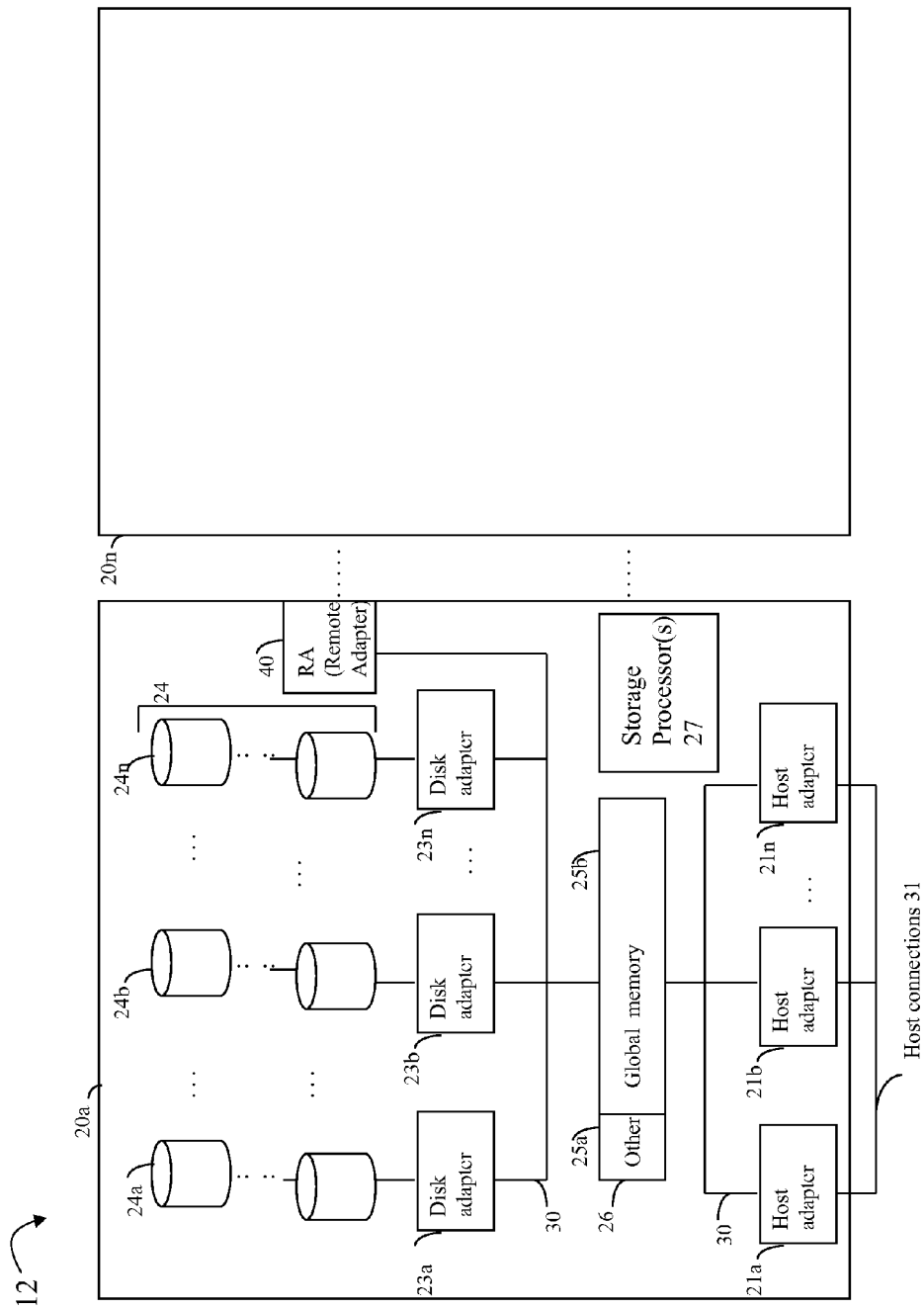
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be a CPU and an embodiment may include any number of such processors. For example, the VNX® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

As noted above, a data storage system may include two SPs (also referred to as main processors or storage system processors A and B) although a data storage system and techniques herein may be used in an embodiment in which the data storage system includes more than two storage processors as mentioned above.

The two SPs 27 may control the operation of the data storage system. The processors may be configured to process requests as may be received from the hosts, other data storage systems, management system, and other components connected thereto. Each of the SPs may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two SPs. Upon the occurrence of failure of one the SPs, the other remaining SP may handle all processing typically performed by both SPs.

I/O operations performed in a data storage system may include I/O operations which are received by the data storage system from an external client, such as a host. Depending on the data storage configuration, the single host I/O operation, such as for a write operation, may result in more than one write operation to one or more physical drives on the data storage system. For example, if the host write is directed to a logical device, such as a LUN, having storage provisioned from a RAID group having a RAID-1 mirroring configuration with two physical drives, then a single front end or host I/O to the LUN results in two back-end physical device writes to each of the two mirrored physical devices of the storage system comprising the RAID group.

Figure 3:
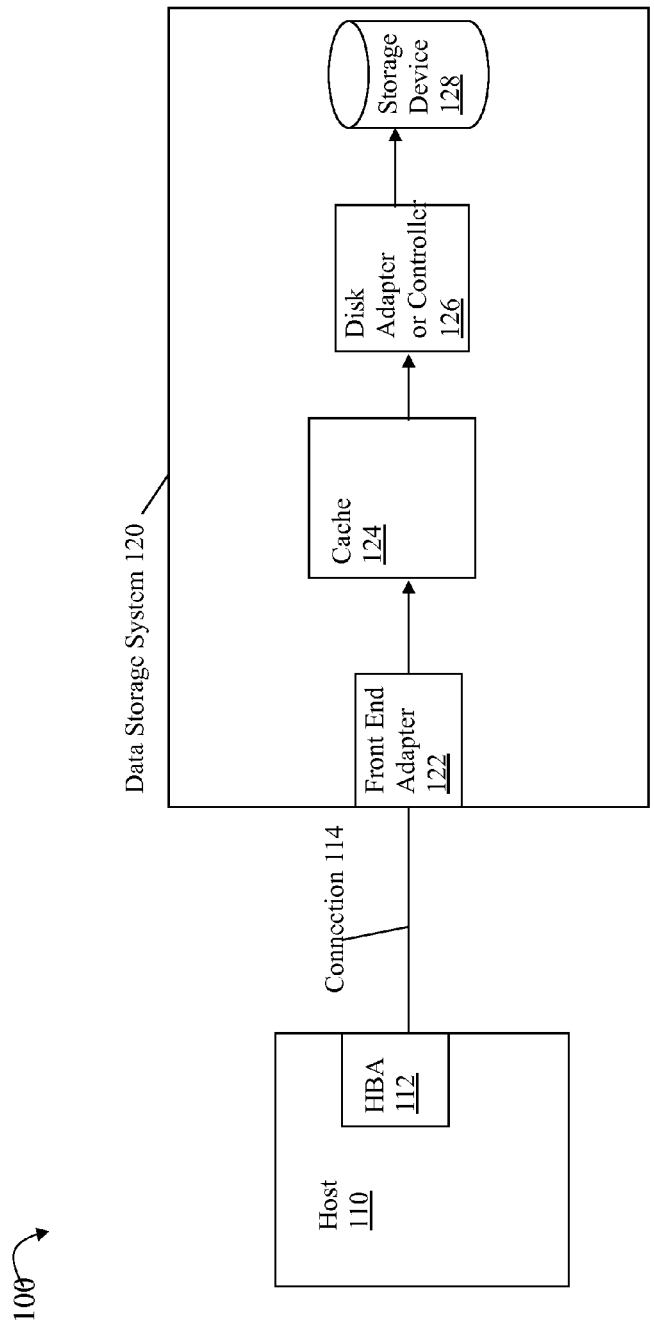
FIG. 3 is an example illustrating a request that may be issued from a host to the data storage system in an embodiment in accordance with techniques herein.

With reference to FIG. 3, shown is an example 100 illustrating components of a system that may be used in an embodiment in accordance with techniques herein. The example 100 includes a simplified view of components of a system as described above. The example 100 includes a host 110 with an HBA 112. The host 110 communicates with data storage system 120 over connection 114. Connection 114 may be, for example, a network connection between the HBA 112 and a front end adapter 122 of the data storage system 120. As described above, a front end adapter 122 may be, for example, an FA. The data storage system 120 also includes a cache 124, a DA or storage controller 126 and one or more physical storage devices 128 (e.g., rotating disks or solid state devices (SSDs) such as a flash drive). The host 110 may issue an I/O operation to the data storage system over connection 114. For example, the host may issue a write operation to write data to a portion of storage device 128. In one embodiment, the data of the write operation may first be stored in cache 124 and then destaged at a later point in time by DA 126 to the physical storage device 128. The foregoing host write operation is an example of an I/O operation of the type described above issued by the client. The single client I/O operation may result in actually writing data to one or more storage devices depending on how the device to which the I/O is directed is configured. When performing a read I/O operation received by the front end adapter 122, processing may first determine whether the data requested is already in cache 124 (thereby resulting in a cache hit or read hit). If the requested read data is in cache 124, the data is retrieved from cache 124 and returned to the host 110. Thus, a read resulting in a cache hit may be serviced without having to access the physical storage device 128 for the data. If the requested data is not in cache 124, the data is retrieved by the DA 126 from the storage device 128, stored in cache 124, and then returned by the front end adapter 122 to the host 110.

As described in more detail in following paragraphs and figures and with reference to FIG. 2, each of the SPs 27 may have its own instance of a data model, such as a object model, that represents various logical and physical aspects of the data storage configuration. The data model may include objects representing physical and logical entities in the data storage system. For example, objects may exist in the model representing the data storage system configuration whereby the objects may represent physical entities such as the physical drives (PDs) and logical entities such as a RAID Group, a LUN, and the like. Each PD may have a corresponding PDO (physical drive object). Furthermore, associated with each PDO may be a PVO (provision drive object) which is used in connection with representing and handling aspects of storage provisioning and other operations with respect the underlying PDO and PD. For example, a PVO may be used to represent aspects of provisioned physical storage of a physical drive (as represented by its PDO associated with the PVO) such as for RAID groups (e.g. indicating that the PD is a member of a particular RAID group). For example, the PVO may be used in connection with coordinating performing a firmware update of a PD associated with the PVO. In one embodiment, it should be noted that if there is no PVD associated with a PD, the PD may not have yet been provisioned and configured into other logical entities, such as into RAID groups, LUNs, and the like, for use in storing client data.

As known in the art, an object may have data fields corresponding to attributes describing the object and associated procedures or routines known as methods. A method may be invoked to perform an action or operation on an object. Objects may be instances of defined object classes. Objects and associated methods may be written using any suitable programming language such as, for example, C++ and Java.

Figure 4:
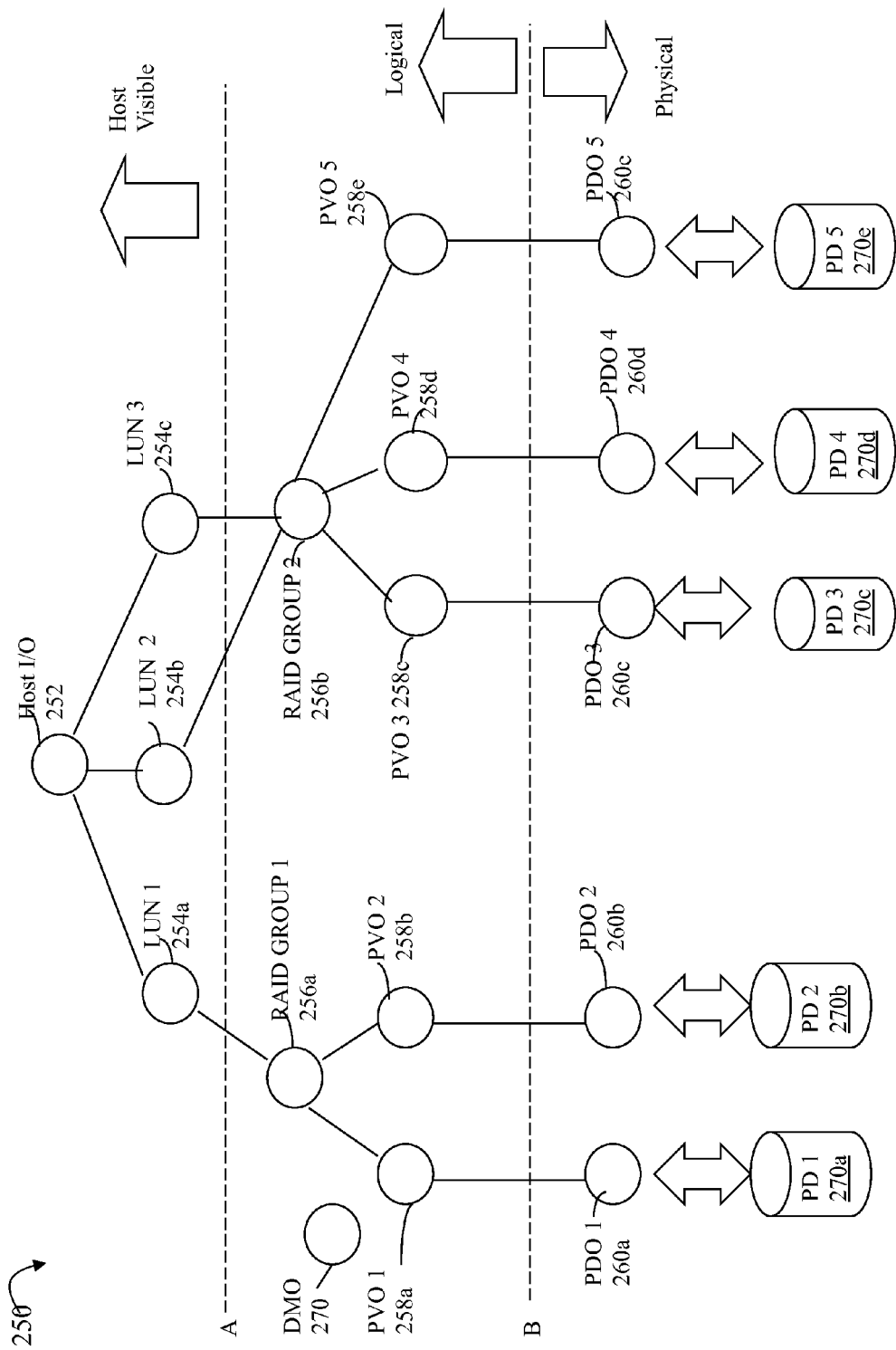
FIGS. 4 and 5 are examples illustrating objects as may be included in an object model or topology in an embodiment in accordance with techniques herein.

Referring to FIG. 4, shown is an example of a graph that may be used in an embodiment in accordance with techniques herein to represent the data model as may be maintained on each SP. The example 250 includes a graph with nodes and edges between the nodes. The graph in this example forms a tree having a root node 252 at a first level, nodes 254a-254c at a second level, nodes 256a-256b at a third level, nodes 208a-258e at a fourth level and leaf nodes 260a-260e at a fifth level. The graph may be a representation of logical and/or physical components in the data storage system with the root node 252 corresponding to an aggregator or external interface node for the data storage system, or more specifically, an interface node to the data storage system. Each node in the graph other than the root node represents an object associated with a corresponding physical or logical entity in the data storage system. The leaf nodes at the fifth level correspond to objects associated with physical storage devices, such as rotating disk drives (e.g., Fibre channel drives, SATA drives) or SSDs (solid state storage devices such as comprising flash-based memory). Nodes at levels other than the first level (root node) and bottom most level (level 5 including leaf nodes 260a-260e) may correspond to, for example, RAID groups, drives or members of a RAID group, LUNs, and the like. In this example, nodes 254a-254c correspond, respectively, to objects associated with LUNs 1-3, nodes 256a-256b correspond, respectively, to objects associated with RAID GROUPS 1 and 2, nodes 258a and 258b correspond to PVOs associated with RAID drives or members of RAID GROUP 1, nodes 258c-258e correspond to PVOs associated with RAID drives or members of RAID GROUP 2, and nodes 260a-260e correspond to physical device objects (PDOs) associated with physical storage devices (PDs) 270a-e. Each PDO may be associated with a single PD, and each PDO may be associated with a single PVO. To further illustrate, object 256a may represent a mirroring configuration object such as for a RAID-1 configuration whereby PD 1 represented by PDO 260a and PD2 represented by PDO 260b are mirrors of each other.

A path in the graph may correspond to an I/O path over which an I/O operation may be forwarded to a physical device (PD) for processing. For example, a host I/O operation directed to LUN 3 to write data may result in writing user data and/or parity information to a portion of PD5 forwarded along the path represented by nodes 252, 254c, 256b, 258e, 260e. The foregoing may be a complete path from the root to a leaf node. An I/O operation may be forwarded along a path from a first node which is at a level M in the graph, M>1 (e.g., the root node is at level 1), to one of its descendant nodes in the graph, such as one of the leaf nodes or other nodes at a level>M in the graph.

Also included in the example 250 are dashed lines denoted as A and B. Portions of the graph above line A may represent those entities of the data storage system which are visible to the host or other external client. For example, the host may send I/O requests directed to one or more LUNs. The host may not have any knowledge regarding underlying RAID groups that may be included in an embodiment. Nodes below line A may correspond to entities known or exposed within the data storage system, but not to the host. Dashed line B represents the partitioning of the graph into nodes corresponding to physical and logical entities. Nodes above line B (other than the root) may correspond to logical entities (e.g., LUNs, RAID groups, RAID drives or members) of the data storage system. Nodes below line B may correspond to physical entities, such as physical storage devices, of the data storage system.

As described herein and illustrated in connection with FIG. 4, an embodiment may utilize a topology of objects to represent a current configuration and state of the data storage system. An I/O operation may be represented by a I/O path in the object topology such as illustrated in FIG. 4 whereby the I/O operation processing may be characterized as traversing the I/O path in the object topology when servicing the I/O operation request. Additionally there may be services, such as a library of service routines, invoked at different levels in the object topology such as by methods of the objects in the path. In connection with this runtime traversal of an object stack such as represented by a path in the topology of FIG. 4 (e.g., from the root node 252 to one of the leaf nodes 260a-e, memory may be allocated by each object in the runtime object stack at each level in the topology. For example, a method of each object in the object stack and/or service invoked may issue one or more memory allocation requests.

Figure 5:
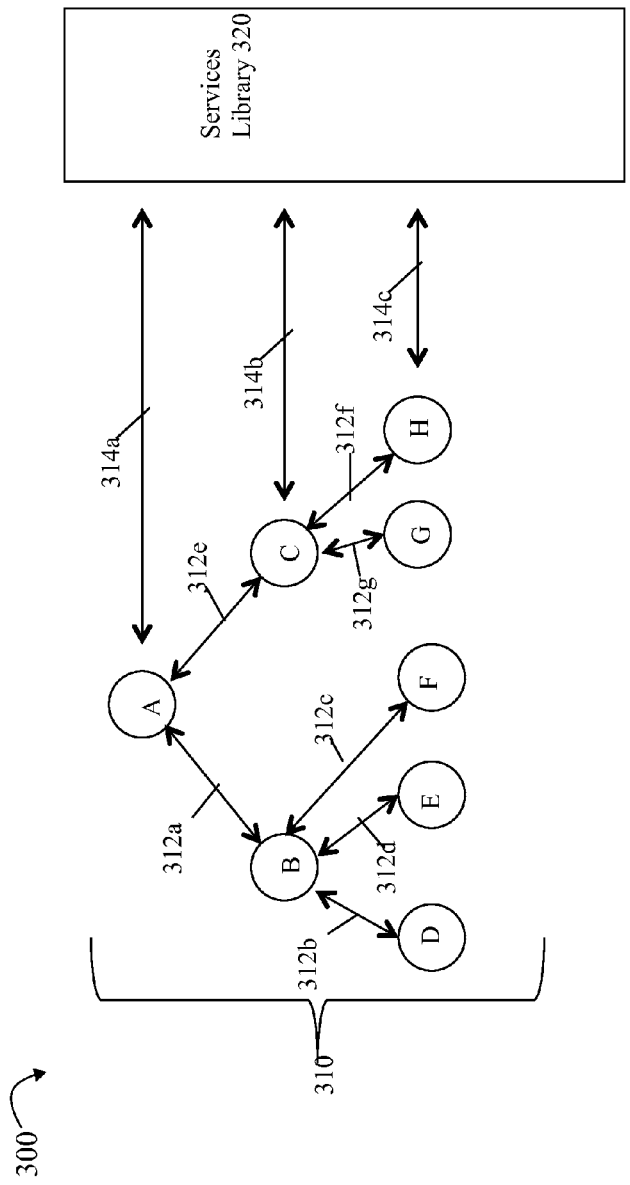

Referring to FIG. 5, shown is an example 300 illustrating a topology of objects and additionally a services library 320 in an embodiment in accordance with techniques herein. The example 300 includes a generic representation of an object topology 310 that may represent the configuration and state of the data storage system at a point in time. The topology 310 is a more generalized or generic representation of objects from that such as illustrated in more detail in FIG. 4. Element 320 may represent a services library of routines that may be invoked at different levels in a particular runtime object stack for an I/O request. The example 300 includes flow arrows 312a-f generally representing possible runtime execution flow up between various objects in the topology when servicing I/O requests. Additionally, flow arrows 314a-c represent the possible runtime execution flow between the services library 320 and various objects at different levels in the topology 310. It should be noted that arrow 314b generally represents possible runtime execution flow between any of nodes B,C at level 2 in the object topology and arrow 314c generally represents the possible runtime execution flow between any of the leaf nodes D, E, F, G, and H at level 3 in the object topology.

Thus, in servicing an I/O operation, memory allocation requests may be made by code executed at various levels in the runtime object stack represented by a particular path in the object topology 310. Additionally, memory allocation requests may be made at runtime by code from the services library 320 whereby a routine of the service library 320 may be invoked by objects, or more specifically a method thereof, at various levels of 310 as illustrated by any of 314a-c.

In connection with techniques herein, each I/O operation is associated with a priority level denoting a memory allocation priority. In one embodiment, the priority level may be an integer greater than or equal to zero (0). Each time there is an allocation of memory in connection with the runtime processing for servicing an I/O operation, the priority level associated with the I/O operation is increased. In this manner, the priority level identifying the number of memory allocation requests that have been performed may denote a runtime level of progress of the I/O operation through the runtime I/O path whereby the runtime I/O path may be represented by the runtime object stack and associated services invoked during runtime.

A first I/O operation having a first priority level that is higher than a second priority level associated with a second I/O operation represents that the first I/O operation has made more memory requests than the second I/O operation. Generally, the higher the priority level associated with an I/O operation, the higher the probability that the I/O operation has more memory allocated than another I/O operation having a lower associated priority level. Processing of the higher priority I/O operation may be closer to completion (e.g., having progressed further along its runtime processing) than the I/O operation having a lower priority.

An embodiment in accordance with techniques herein may have a set of one or more common memory pools from which memory is allocated in response to memory allocation requests in connection with processing I/O operations of any/all priority levels. The set of one or more common memory pools may include, for example, pools of memory each including memory portions of a particular size. For example, a first pool in the common pool set may include portions of memory of a first size such as ½ megabyte, a second pool in the common pool set may include portions of memory of a second size, such as 1 megabyte, and so on. A memory allocation request associated with processing an I/O operation of any priority level may obtain memory from one of the common memory pools based on the amount of memory requests. For example, a request to allocate ½ megabyte of memory may obtain memory from the first pool rather than the second pool. The particular number of pools in the set of common pools and any associated memory allocation sizes may vary with embodiment. Generally, any suitable number, N, of common pools, where N is an integer≥1, may be utilized.

Additionally, an embodiment in accordance with techniques herein may use a reserved pool of memory. The reserved pool of memory may be assigned for use in connection with servicing a single I/O operation for the duration or "lifetime" of such processing (e.g., until the servicing of the I/O operation has completed). The size of the reserved pool may be represented by MAX denoting the maximum amount of memory that may be needed for processing any I/O request. In other words, MAX represents the largest possible upper bound to the cumulative amount of memory that may be allocated at any point in time when processing an I/O operation. For example, an I/O request which is assigned sole usage of the reserved pool during its servicing lifetime is guaranteed to have a sufficient amount of memory to be able to complete whereby all memory allocation requests for processing the I/O request are made from the reserved pool. Thus, the size of the reserved pool may be characterized as the largest cumulative amount of memory that any I/O request will need to complete processing.

In accordance with techniques herein, a value, MAX, may be determined by considering the maximum cumulative amount of memory that may be allocated when processing a single I/O through runtime processing during the lifetime of that I/O operation. For example, MAX may be determined by adding the most memory that can be allocated at each level in the runtime processing through the object stack and service library. To further illustrate, assume it is determined that at most 10 memory allocation requests can be made in connection with runtime processing for any I/O operation and that each of the 10 memory allocation requests has a largest possible size of 2 megabytes per request. In this case, MAX may be determined as 20 megabytes (e.g., 10 requests*2 megabytes) and the size of the reserved pool is 20 megabytes. In this manner, processing for any single I/O is guaranteed to have all memory allocation requests satisfied using the reserved pool.

With reference back to FIG. 4, assume an I/O operation has a runtime object stack as follows: 252, 254b, 256b, 258c, 260c. As runtime processing is performed, the foregoing object stack is traversed and memory allocation requests may be made at various object levels. For example, at a first point in time processing for the I/O operation may be at object 256b and a total of 2 memory allocation requests may be made so far in the runtime processing. The total memory allocated may be 5 megabytes at this first point in time. At a second point in time in processing the I/O operation, processing may be at object 258c and a total of 3 memory allocation requests may be made so far in runtime processing whereby the total memory allocated may now be 5.5 megabytes. At a third point in time in processing the I/O operation, processing may be at object 260c and a total of 4 memory allocation requests may be made so far in runtime processing whereby the total memory allocated may now be 6 megabytes. In this manner, all possible runtime paths for all I/Os are examined, from start to end, and for each such possible path, the total cumulative amount of memory that can be allocated at any point in time is determined as MAX. As also described herein, the total amount of memory currently allocated at each point in time a request is granted may also be tracked and used in connection with techniques herein.

As memory allocation requests are made in connection with processing the various I/Os of different priority levels, the requests are granted by allocating memory from the set of one or more common pools. Additionally, memory may also be returned to the set of one or more common pools as allocated memory is no longer needed or freed in connection with servicing I/O requests. For example, once servicing an I/O operation completes, all memory allocated in connection with the I/O operation servicing may be returned to the set of one or more common pools for use in granting any subsequent memory allocation requests.

At some point, the memory available for allocation from the set of one or more common pools may be exhausted or otherwise contain an insufficient amount of memory required to satisfy a request. A memory allocation request that cannot be granted from the set of one or more common pools may be placed on a wait list of pending memory allocation requests not yet granted.

Figure 6:
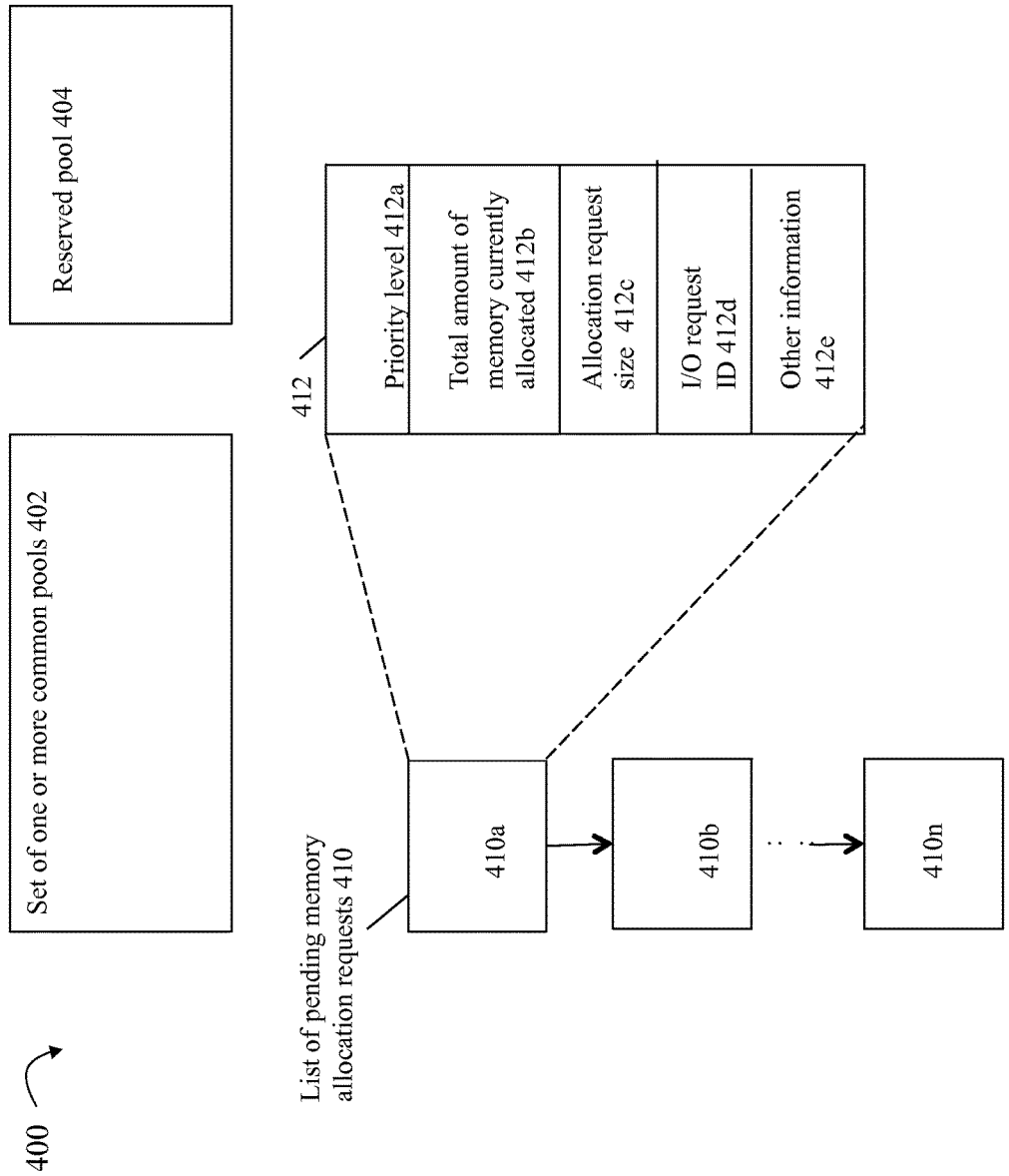
FIG. 6 is an example of memory pools and a list of pending allocation requests that may be used in an embodiment in accordance with techniques herein.

Referring to FIG. 6, shown is an example illustrating the memory pools and list of pending memory requests that may be used in an embodiment in accordance with techniques herein. The example 400 illustrates the pools and pending request list just described.

Element 402 represents the set of one or more common pools of memory from which memory may be allocated to grant a memory allocation request when processing an I/O operation of any priority level. Element 404 represents the reserved pool of memory. Element 410 represents the wait list of pending memory allocation requests which have been issued but not yet granted due to insufficient memory in the set of one or more common pools 402. The wait list 410 is illustrated as including entries 410a-n each of which corresponds to a single pending memory allocation request made in connection with processing an associated I/O request. Element 412 illustrates in more detail information that may be included in entry 410a. Although not explicitly illustrated in FIG. 6, each element of the list 410 may include the detailed information as illustrated by 412.

Entry 410a may include a priority level 412a denoting the memory allocation priority level of the associated I/O operation for the pending request, a total amount of memory currently allocated 412b, an allocation request size 412c identifying the amount of memory requested, an I/O request ID identifying the I/O operation for which the pending memory allocation request was made, and possibly other information 412e. The priority level 412a is the current memory allocation priority level of the I/O operation for which the memory allocation request associated with entry 410a has been made. The total amount of memory currently allocated 412b represents the sum or cumulative amount of memory currently allocated for processing the associated I/O operation. The allocation request size 412c denotes the amount of memory requested but which has not yet been allocated. The I/O request ID may be a unique identifier denoting the particular I/O operation being serviced for which the memory allocation request representing by the entry was made.

The list 410 may be sorted or ordered from highest to lowest priority level as denoted by field 412a of each entry of the list 410. Additionally, the list 410 may be further sorted using the total amount of memory currently allocated 412b as secondary criteria. For example, all entries of the same priority level may be further sorted in the list, from highest to lowest total amount of memory currently allocated 412b. An embodiment may implement 402, 404 and 410 using any suitable data structures known in the art. For example, the list 110 may be implemented as a single or double linked list.

When memory is returned to the set of one or more common pools 402 (e.g., such as when an I/O request completes whereby memory allocated for servicing the I/O request is freed and returned to the set of one or more common pools 402), one or more entries from the list 410 may be selected. Each such entry may be a pending request for which requested memory is now allocated from the memory just returned to the one or more common pools 402. The list 410 may be examined to select a pending request for which memory is allocated whereby such selection may be made in accordance with one or more criteria. The criteria may include, for example, any of the priority level 412a, the total amount of memory currently allocated 412b and the allocation request size 412c. The selected entry may represent the pending request on the list having the highest priority level in 412a. If there are multiple requests having the same highest priority level in 412a, the selected entry may additionally have the largest amount of memory currently allocated in 412b of all such multiple entries having the same highest priority level. Additionally, the entry selected represents an I/O request that can be granted or satisfied using the available memory in the set of one or more common pools. In this manner, the information in the allocation request size 412c may be utilized to ensure that the amount of memory requested as denoted in 412c of the entry is currently available in the set of one or more common pools 402. Processing may be performed to repeatedly select pending requests from the list 410 until either there are no further pending requests in the list 410, or until there is insufficient memory in the set of one or more common pools 402 to grant any further pending requests from the list 410. Thus, assuming there are pending memory requests on the list 410, as memory is freed and returned to the set of one or more common pools 402, a pending request that can be granted is selected from the list 410 whereby the selecting request has a corresponding entry in the list 410 with the highest priority level in 412a and, among all entries having the same highest priority level, the largest amount denoted in 412b. The priority level 412a may be characterized as first or primary criterion used to select an entry from the list 410. The total amount of memory currently allocated 412b may be characterized as secondary criterion used to select an entry from the list 410 whereby the value in 412b may be used to select among entries having the same highest priority level.

At some point, it may the case that the system detects the existence of conditions which require special processing to be performed in accordance with deadlock avoidance. For example, an embodiment may detect the existence of one or more conditions. Responsive to detecting the existence of such conditions, special processing is performed. In one embodiment, processing may be performed to detect the existence of the following: when there are one or more pending requests on the list 410 and no I/O completes within a specified threshold amount of time, or more generally, whereby no memory is freed and returned to the set of one or more common pools 402 for some specified threshold amount of time. The threshold amount of time may be, for example, several hundred milliseconds (e.g., 300-500 milliseconds).

In response to detecting the existence of the above-mentioned conditions, special processing may be performed to avoid and/or prevent deadlock. Such special processing may select and grant one of the pending memory allocation requests in the list 410 using the reserved pool 404. The entry selected from the list 410 of pending memory allocation requests may be based on the criteria as described above. In particular, the selected entry may represent the pending request on the list 410 having the highest priority level in 412a. If there are multiple requests having the same highest priority level in 412a, the selected entry may additionally have the largest amount of memory currently allocated in 412b of all such multiple entries having the same highest priority level.

Additionally, the I/O operation associated with the selected entry is assigned exclusive use of the reserved pool 404 for the duration or lifetime of the I/O operation (e.g., for the duration of processing the I/O operation). The I/O operation associated with the selected entry on the list 410 may be identified by the I/O request ID field 412d of the selected entry. An embodiment may, for example, store the I/O operation assigned exclusive use of the reserved pool 404 in a location in memory, or otherwise use any suitable technique to denote the foregoing. The I/O operation assigned exclusive use of the reserved pool 404 may be characterized as "marked". At a subsequent point in time, a second memory allocation request may be made in connection with processing the marked I/O operation. If there is sufficient memory in the set of one or more common pools 402 to grant the second memory request, then the requested memory is allocated from the set of one or more common pools 402. Otherwise, if there is not a sufficient amount of memory in the set of one or more common pools 402 to grant the second memory request, then the requested memory is allocated from the reserved pool 404. In this manner, a memory allocation request made during processing the marked I/O operation is always guaranteed to be granted without the request being placed on the list 410. At a later point in time, processing for the marked I/O operation completes whereby resources utilized during such processing are freed and made available for other use. The resources freed include any memory from the set of one or more common pools 402 and the reserved pool 404 that had been allocated for use in processing the completed marked I/O operation. Thus, once the marked I/O operation completes, the reserved pool 404 is available for reassignment, as may be needed, for sole exclusive use by another I/O operation for its duration or lifetime. Additionally, any memory returned to the set of one or more common pools 402 is also now available for use in granting any currently pending requests in the list and/or any subsequently received requests for memory.

As described herein, a single reserved pool 404 for a single marked I/O operation may be used in an embodiment. More generally, an embodiment in accordance with techniques herein may have any suitable number of reserved pools, each of the MAX size and each for exclusive used by a single marked I/O operation. Typically, an embodiment may select a small number of reserved pools and thus a small number of possible marked I/O operations.

It should be noted that if a system is observed as allocating memory only from the reserved pool 404 thereby indicating that the set of one or more common pools 402 is always exhausted, then further adjustments to system resources may be needed such as, for example, by increasing the amount of memory in the set of one or more common pools 402, reducing the I/O workload of the system, and the like.

The foregoing describes an embodiment using techniques herein with an object-based topology and in connection with memory as the resource. More generally, techniques herein may be used in connection with other suitable non-object-based embodiments, with other resources other than memory, and in connection with other consumer entities besides I/O operation processing which consumes the resource. Techniques may be generally be used an embodiment with a defined process whereby the upper bound, MAX, of the resource usage during the processing may be determined. Consistent with the foregoing, other items described herein may also be accordingly generalized. For example, the set of one or more common pools and the reserved pool may be pools of a resource used in connection with resource requests by consumers of the resource. The assignment of the reserved resource pool to a single consumer may be for the lifetime of the consumer, or processing associated with the consumer entity.

In accordance with techniques herein, granting of the memory allocation request may be delayed (e.g., such as when place on the wait list) but may never be denied or not granted. In other words, in response to a memory allocation request, an embodiment in accordance with techniques herein does not return a response indicating not granted or denied. The foregoing may be contrasted with a typical memory allocation request that returns a response immediately based on currently available memory. If at the time the request is made there is sufficient available memory, the request is granted. Otherwise, a response to the request may be returned indicating failure to grant the requested memory allocation.

In an embodiment utilizing techniques herein as described above, pending memory allocation requests in the wait list may be processed and granted, if possible, prior to any subsequently received requests. Additionally, an embodiment may also incorporate and utilize other techniques than as described herein, such as in connection with maintaining the wait queue.

Described herein are deadlock avoidance techniques where the exemplary resource is memory and the consumer is an I/O operation being serviced (e.g., processing performed to service the I/O operation). Described herein is a memory allocation mechanism that may be used in a system with an I/O path that is built from a topology of objects. As run time processing is performed for this I/O operation traversing this topology, memory may be allocated at one or more points in the runtime processing. In one embodiment as described herein, such processing may not be able to free the prior memory it allocated at previous steps in the topology until the I/O processing completes. Techniques described herein provide a memory allocation mechanism which ensures that at least one I/O in the system is always guaranteed to make progress to avoid the deadlock whereby such I/O may be assigned exclusive usage of the reserved pool for its processing duration or lifetime.

For example, with reference back to FIG. 4, processing to service an I/O operation may start at the top or root of the topology and traverse down a complete path to one of the leaf nodes, such as one of the PDOs 260a-e. At multiple levels in the topology, processing for the I/O operation may need to perform one or more memory allocations. Additionally, as in at least one embodiment, as runtime progress down the object stack toward the leaf node progresses, it may not be possible to free any granted memory allocations. For example, an object represented by 260c at level 5 will expect prior memory allocations made in connection with other levels to continue to exist. Thus we are left with a memory allocation policy where the I/O operation processing holds onto "old" allocations when a subsequent request is made for additional memory. As memory is allocated when processing an I/O operation, the priority level denoting the memory allocation priority level associated with the I/O operation is increased by 1. This memory allocation priority allows the system to know which I/O operation is the one that has made the most prior memory allocation requests. Generally, the higher the priority level, the higher the probability is that the associated I/O operation has more memory allocated than a another I/O operation with a lower associated priority. As described herein, the memory system may have a set of common memory pools of various sizes and types, which it will attempt to allocate memory from for any new memory request. The memory system also has a wait list for requests that were not satisfied immediately using a common memory pool. If a request for memory is not able to obtain requested memory, then the request is place on the then it is placed on the wait list. The wait list is evaluated as allocated memory from the common pools in order to re-activate waiting requests for memory. One example of a deadlock scenario which techniques herein avoids is a scenario where many requests are traversing the topology, but have not yet obtained all their memory. These requests have the potential to exhaust all the memory and there may be many pending memory requests that cannot be granted. In accordance with techniques herein, deadlock is prevents by recognizing the deadlock potential. That is, the techniques herein recognize that there may be many pending requests that cannot obtain memory from the common pool. In accordance with techniques herein, one of the requests may be selected in accordance with criteria that includes that the request have the highest priority of pending requests. The selected request is determined to be associated with the I/O operation having the most potential memory to release once the I/O completes. The I/O operation associated with the selected memory request is then given sole access to a "reserved pool" of memory. This reserved pool is sized large enough to ensure that this memory request and this I/O in general will get all the memory that it needs to complete. As described herein, the "reserved pool" is assigned for exclusive use by the I/O operation for the duration of the I/O operation (e.g., for the lifetime of the I/O operation which is processing required to complete servicing the I/O operation). The foregoing use of the reserved pool allows subsequent memory allocations performed for this I/O operation at any point in the topology to be guaranteed to obtain memory without placement in the wait list. Once the I/O completes, all memory currently allocated for use in servicing the I/O operation is also released, including the "reserved pool".

What will now be described are flowcharts included in figures which summarize processing described above that may be performed in an embodiment in accordance with techniques herein.

Figure 7:
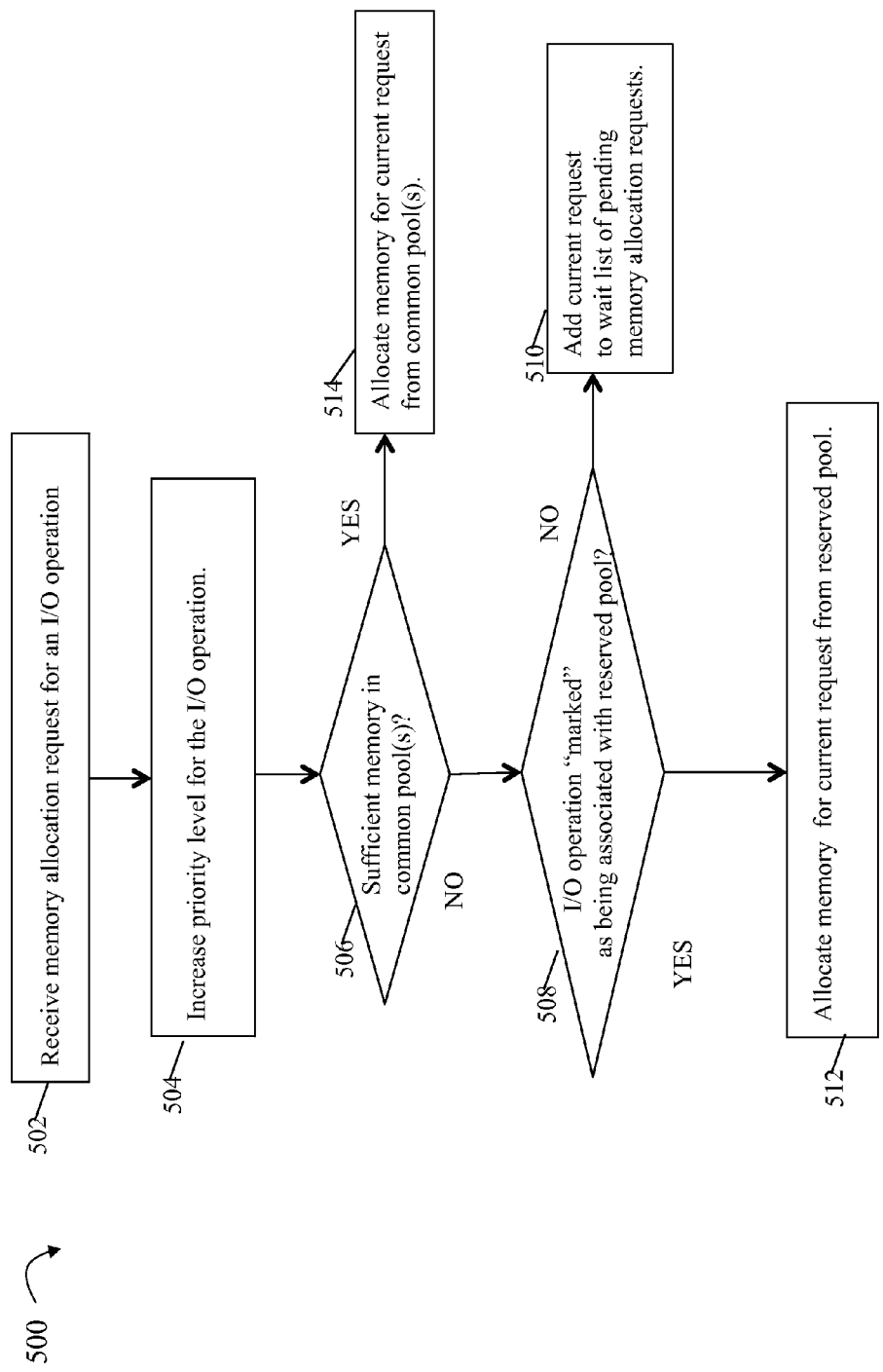
FIGS. 7-10 are flowcharts of processing steps that may be performed in an embodiment in accordance with techniques herein.

Referring to FIG. 7, shown is a flowchart 500 of processing steps that may be performed in connection with processing a received memory allocation request in an embodiment in accordance with techniques herein. At step 502, the memory allocation request is received which requests memory in connection with processing or servicing an I/O operation. At step 504, the priority level of the I/O operation is incremented. As described above, the priority level is the memory allocation priority level that is increased each time there is a memory allocation request made on behalf of the associated I/O operation. At step 506, a determined is made as to whether there is sufficient memory available in the set of one or more common pools to grant the current memory allocation request. If step 506 evaluates to yes, control proceeds to step 514 where the requested memory is allocated from the set of one or more common pools. If step 506 evaluates to no, control proceeds to step 508. At step 508, a determination is made as to whether the I/O operation is "marked" as being associated with the reserved pool. If step 508 evaluates to no, control proceeds to step 510 to add the current request to the wait list of pending memory allocation requests. If step 508 evaluates to yes, control proceeds to step 512 to allocate memory for the current request from the reserved pool.

Figure 8:
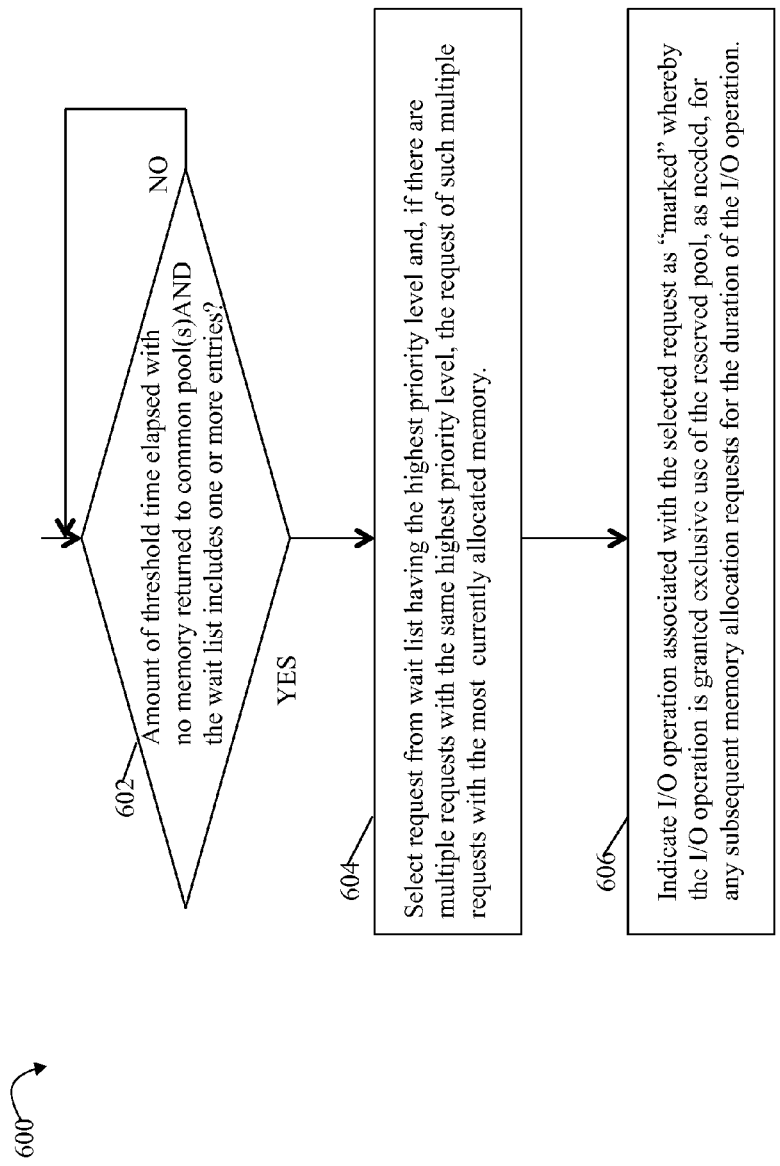

Referring to FIG. 8, shown is a flowchart 600 of processing steps that may be performed in connection with deadlock avoidance responsive to detecting the existence of certain conditions in an embodiment in accordance with techniques herein. At step 602, a determination is made regarding a first condition as to whether the threshold amount of time has elapsed without having any memory freed or returned to the set of one or more common pools. Additionally, step 602 makes a determination regarding a second condition as to whether there are any entries on the wait list. Processing remains at step 602 until both of the foregoing conditions are true and then proceeds to step 604. If step 602 evaluates to yes, it means that conditions of potential deadlock have been detected and processing is performed to alleviate such conditions. At step 604, a request is selected from the wait list having the having the highest priority level and, if there are multiple requests with the same highest priority level, the request selected is also the one of such multiple requests with the most currently allocated memory. At step 606, the I/O operation associated with the selected request from step 604 is "marked" whereby the I/O operation is granted exclusive use of the reserved pool, as needed, for any subsequent memory allocation requests for the duration of the I/O operation.

Figure 9:
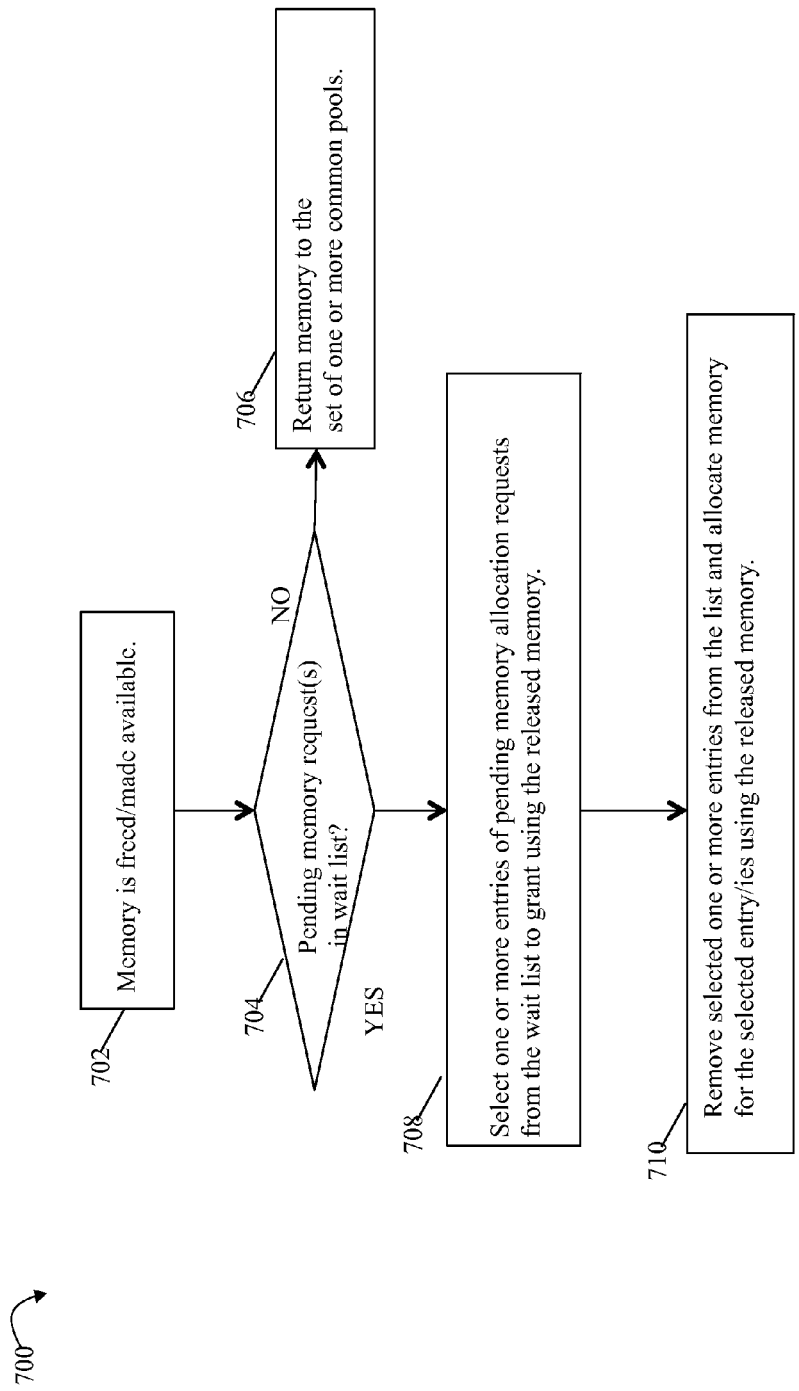

Referring to FIG. 9, shown is a flowchart 700 of processing steps that may be performed in response to memory being released, freed, or otherwise made available for reuse in an embodiment in accordance with techniques herein. At step 702, allocated memory from the set of one or more common pools is now released thereby made available for reuse in servicing other memory allocation requests. Memory may be freed as in step 702 in response to an I/O operation completing whereby the I/O operation has been serviced. In step 704, a determination is made as to whether there are any pending memory requests in the wait list. If step 704 evaluates to no, control proceeds to step 706 to return the memory to the set of one or more common pools. If step 704 evaluates to yes, control proceeds to step 708 to select one or more entries of pending memory allocation requests from the wait list to be granted using the memory released in step 702. It should be noted that the criteria used to select the entries in step 704 may be as described above whereby such selected entries have the highest priority level(s) of all entries in the list. In other words, entries in the list are ranked, from highest to lowest priority level as denoted by field 412a of such entries. Additionally, if there are multiple requests having the same priority level, such multiple requests are further ranked with respect to one another in order of decreasing total amount of memory currently allocated for the associated I/O request (as denoted by field 412*b*). The one or more requests selected are selected in accordance with the foregoing criteria. In step 710, the one or more selected entries are removed from the wait list and memory is allocated for the selected entry/ies using the memory released in step 702.

Figure 10:
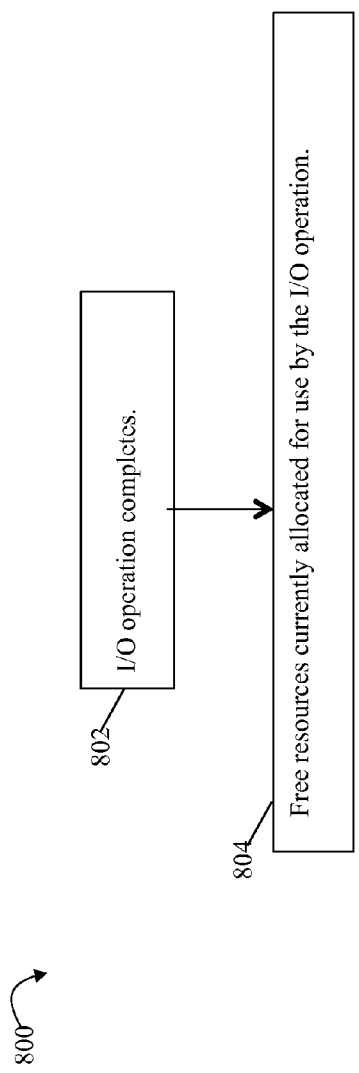

Referring to FIG. 10, shown is a flowchart 800 of processing steps that may be performed in connection with I/O operation completion in an embodiment in accordance with techniques herein. In step 802, an I/O operation completes whereby all processing has commenced in connection with servicing the I/O operation and a response can be returned to the requester, such as the host which issued the I/O operation. In step 804, all resources currently allocated for use in connection with servicing the I/O operation are now released or freed. Step 804 may include releasing or freeing any memory from the set of one or more common pools that is currently allocated for the I/O operation. Step 804 may also include disassociating the current I/O operation with the reserved pool, thereby releasing the reserved pool's exclusive access and usage by the I/O operation, if the I/O operation is currently "marked".

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of avoiding deadlock comprising:
   assigning, using a processor, a plurality of consumers a plurality of priority levels, wherein each of the plurality of consumers is assigned one of the plurality of priority levels denoting a number of resource allocation requests that have been currently granted to said each consumer, wherein said one priority level is incremented each time a resource allocation request for said consumer is granted;
   providing, using a processor, a set of one or more common resource pools and a reserved resource pool, wherein said set of one or more common resource pools are used in granting resource requests made by any of the plurality of consumers and wherein the reserved resource pool is used in granting resource requests made by a single one of the plurality of consumers for a lifetime of said single consumer;
   maintaining, using a processor, a wait list of pending resource requests made by one or more of said plurality of consumers;
   determining, using a processor, that no allocated resources of the set of one or more common resource pools have been released for at least a threshold amount of time and that there is at least one request on the wait list;
   in response to determining that no allocated resources of the set of one or more common resource pools have been released for at least a threshold amount of time and that there is at least one request on the wait list, performing first processing using a processor, said first processing including:
      selecting, in accordance with one or more criteria and using a processor, a first of said pending resource requests from said wait list, wherein said first pending resource request was made by a first of said plurality of consumers; and
      assigning, using a processor, said first consumer exclusive use of said reserved resource pool for a lifetime of said first consumer, wherein the method is executed on a data storage system, each of the plurality of consumers is an I/O operation having processing performed to service the I/O operation, and the set of one or more common resource pools and the reserved resource pool are pools of memory on the data storage system, and wherein subsequent resource requests for memory from the first consumer are granted from the set of one or more common resource pools if the set of one or more common resource pools have sufficient resources, and otherwise granted from the reserved resource pool.

2. The method of claim 1, further comprising:
granting said first pending resource request using said reserved resource pool.

3. The method of claim 2, further comprising:
receiving a second resource request from said first consumer;
determining whether there are sufficient resources in the set of one or more common resource pools to grant said second resource request; and
responsive to determining that there are insufficient resources in the set of one or more common resource pools to grant said second resource request, granting said second resource request of the first consumer using the reserved resource pool.

4. The method of claim 3, further comprising:
responsive to determining that there are sufficient resources in the set of one or more common resource pools to grant said second resource request, granting said second resource request using the set of one or more common resource pools.

5. The method of claim 3, further comprising:
receiving a third resource request from a second of said plurality of consumers different from the first consumer;
determining whether there are sufficient resources in the set of one or more common resource pools to grant said third resource request; and
responsive to determining that there are sufficient resources in the set of one or more common resource pools to grant said third resource request, granting said third resource request of the second consumer using the set of one or more common resource pools.

6. The method of claim 5, further comprising:
responsive to determining that there are insufficient resources in the set of one or more common resource pools to grant said third resource request, adding said third request to the wait list.

7. The method of claim 1, wherein said reserved pool has an amount of resources determined as an upper bound representing a maximum cumulative resource amount potentially required by a consumer during a lifetime of a consumer.

8. The method of claim 1, wherein said one or more criteria includes determining which pending resource request in said wait list has a highest one of the priority levels of all pending resource requests in said wait list.

9. The method of claim 8, wherein, if there are multiple pending resource requests in said wait list having a same highest priority level, one of the multiple pending resource requests is selected having a largest amount of currently allocated memory with respect to said multiple pending resource requests.

10. The method of claim 1, wherein when said first consumer completes processing, resources assigned to, or used by, said first consumer are released whereby any resources allocated to said first consumer from said set of one or more common resource pools are released and whereby said reserved resource pool is available for reassignment to another one of the plurality of consumers for exclusive use by said another one consumer.

11. The method of claim 1, wherein runtime processing for said I/O operation traverses a path in an object topology corresponding to said runtime processing.

12. A non-transitory computer readable medium comprising code stored thereon that, when executed, performs a method for avoiding deadlock comprising:
assigning, using a processor, a plurality of consumers a plurality of priority levels, wherein each of the plurality of consumers is assigned one of the plurality of priority levels denoting a number of resource allocation requests that have been currently granted to said each consumer, wherein said one priority level is incremented each time a resource allocation request for said consumer is granted;
providing, using a processor, a set of one or more common resource pools and a reserved resource pool, wherein said set of one or more common resource pools are used in granting resource requests made by any of the plurality of consumers and wherein the reserved resource pool is used in granting resource requests made by a single one of the plurality of consumers for a lifetime of said single consumer;
maintaining, using a processor, a wait list of pending resource requests made by one or more of said plurality of consumers;
determining, using a processor, that no allocated resources of the set of one or more common resource pools have been released for at least a threshold amount of time and that there is at least one request on the wait list;
in response to determining that no allocated resources of the set of one or more common resource pools have been released for at least a threshold amount of time and that there is at least one request on the wait list, performing first processing using a processor, said first processing including:
selecting, in accordance with one or more criteria and using a processor, a first of said pending resource requests from said wait list, wherein said first pending resource request was made by a first of said plurality of consumers; and
assigning, using a processor, said first consumer exclusive use of said reserved resource pool for a lifetime of said first consumer, wherein the method is executed on a data storage system, each of the plurality of consumers is an I/O operation having processing performed to service the I/O operation, and the set of one or more common resource pools and the reserved resource pool are pools of memory on the data storage system, and wherein subsequent resource requests for memory from the first consumer are granted from the set of one or more common resource pools if the set of one or more common resource pools have sufficient resources, and otherwise granted from the reserved resource pool.

13. The non-transitory computer readable medium of claim 12, wherein the method further comprises:
granting said first pending resource request using said reserved resource pool.

14. The non-transitory computer readable medium of claim 13, wherein the method further comprises:
receiving a second resource request from said first consumer;
determining whether there are sufficient resources in the set of one or more common resource pools to grant said second resource request; and
responsive to determining that there are insufficient resources in the set of one or more common resource pools to grant said second resource request, granting said second resource request of the first consumer using the reserved resource pool.

15. The non-transitory computer readable medium of claim 14, wherein the method further comprises:
responsive to determining that there are sufficient resources in the set of one or more common resource pools to grant said second resource request, granting said second resource request using the set of one or more common resource pools.

16. The non-transitory computer readable medium of claim 14, wherein the method further comprises:
receiving a third resource request from a second of said plurality of consumers different from the first consumer;
determining whether there are sufficient resources in the set of one or more common resource pools to grant said third resource request;
responsive to determining that there are sufficient resources in the set of one or more common resource pools to grant said third resource request, granting said third resource request of the second consumer using the set of one or more common resource pools; and
responsive to determining that there are insufficient resources in the set of one or more common resource pools to grant said third resource request, adding said third request to the wait list.

17. The non-transitory computer readable medium of claim 12, wherein said reserved resource pool has an amount of resources determined as an upper bound representing a maximum cumulative resource amount potentially required by a consumer during a lifetime of a consumer.

18. The non-transitory computer readable medium of claim 12, wherein said one or more criteria includes determining which pending resource request in said wait list has a highest one of the priority levels of all pending resource requests in said wait list, and wherein, if there are multiple pending resource requests in said wait list having a same highest priority level, one of the multiple pending resource requests is selected having a largest amount of currently allocated memory with respect to said multiple pending resource requests.

19. A system comprising:
   a processor; and
   a memory comprising code stored therein that, when executed by the processor, performs a method of avoiding deadlock comprising:
      assigning, using the processor, a plurality of consumers a plurality of priority levels, wherein each of the plurality of consumers is assigned one of the plurality of priority levels denoting a number of resource allocation requests that have been currently granted to said each consumer, wherein said one priority level is incremented each time a resource allocation request for said consumer is granted;
      providing, using the processor, a set of one or more common resource pools and a reserved resource pool, wherein said set of one or more common resource pools are used in granting resource requests made by any of the plurality of consumers and wherein the reserved resource pool is used in granting resource requests made by a single one of the plurality of consumers for a lifetime of said single consumer;
      maintaining, using the processor, a wait list of pending resource requests made by one or more of said plurality of consumers;
      determining, using the processor, that no allocated resources of the set of one or more common resource pools have been released for at least a threshold amount of time and that there is at least one request on the wait list;
      in response to determining that no allocated resources of the set of one or more common resource pools have been released for at least a threshold amount of time and that there is at least one request on the wait list, performing first processing using the processor, said first processing including:
         selecting, in accordance with one or more criteria and using a processor, a first of said pending resource requests from said wait list, wherein said first pending resource request was made by a first of said plurality of consumers; and
         assigning, using the processor, said first consumer exclusive use of said reserved resource pool for a lifetime of said first consumer, wherein each of the plurality of consumers is an I/O operation having processing performed to service the I/O operation, and the set of one or more common resource pools and the reserved resource pool are pools of memory, and wherein subsequent resource requests for memory from the first consumer are granted from the set of one or more common resource pools if the set of one or more common resource pools have sufficient resources, and otherwise granted from the reserved resource pool.

* * * * *